(12) United States Patent
Troisvallets et al.

(10) Patent No.: US 10,402,406 B2
(45) Date of Patent: Sep. 3, 2019

(54) PREDICTIVE DATABASE FOR COMPUTER PROCESSES

(71) Applicant: Amadeus S.A.S., Biot (FR)

(72) Inventors: Fabien Troisvallets, Mougins (FR); Anael Orlinski, Golfe Juan (FR)

(73) Assignee: AMADEUS S.A.S., Boit (FR)

( * ) Notice: Subject to any disclaimer, the term of this patent is extended or adjusted under 35 U.S.C. 154(b) by 156 days.

(21) Appl. No.: 15/383,059

(22) Filed: Dec. 19, 2016

(65) Prior Publication Data

US 2018/0173768 A1 Jun. 21, 2018

(51) Int. Cl.
G06F 17/30 (2006.01)
G06F 16/2455 (2019.01)
G06F 16/28 (2019.01)

(52) U.S. Cl.
CPC ...... *G06F 16/24564* (2019.01); *G06F 16/284* (2019.01)

(58) Field of Classification Search
None
See application file for complete search history.

(56) References Cited

U.S. PATENT DOCUMENTS

| | | | | |
|---|---|---|---|---|
| 6,546,389 B1 * | 4/2003 | Agrawal | ................ | G06Q 30/02 |
| 8,250,008 B1 | 8/2012 | Cao et al. | | |
| 8,725,661 B1 * | 5/2014 | Goldman | ............ | G06N 99/005 |
| | | | | 706/12 |
| 9,195,735 B2 * | 11/2015 | Sasaki | ................ | G06F 16/9537 |
| 9,589,056 B2 * | 3/2017 | Wang | ................ | G06F 16/9535 |
| 2007/0239637 A1 * | 10/2007 | Paek | ................ | G06F 17/276 |
| | | | | 706/20 |
| 2012/0299831 A1 * | 11/2012 | Lioy | ................ | G06F 21/36 |
| | | | | 345/168 |
| 2014/0019443 A1 * | 1/2014 | Golshan | ............ | G06F 17/30867 |
| | | | | 707/723 |
| 2014/0188883 A1 * | 7/2014 | Sasaki | ................ | G06F 16/9537 |
| | | | | 707/737 |

(Continued)

OTHER PUBLICATIONS

European Patent Office, Search Report issued in Application No. EP 17 20 8409 dated Apr. 17, 2018.

(Continued)

*Primary Examiner* — Hung D Le
(74) *Attorney, Agent, or Firm* — Thompson Hine LLP

(57) ABSTRACT

Systems, methods, and computer program products for implementing a predictive database that improves the success rate of computer processes. Historic input data including user-entered data objects for each of several computer processes is received. Several relationships are determined based on the historic input data, where each of the relationships includes a data object entered for one of the success computer processes linked to another data object entered for the successful computer process. A decision tree is generated and filtered based on the relationships and an optimization threshold. Several rules are generated based on the filtered decision tree and are stored in the predictive database. Thereafter, in response to receiving partial input data entered by a user in relation to a requested computer process, additional input data is determined and supplied to the requested computer process based on the rules and the partial input data.

20 Claims, 5 Drawing Sheets

(56) References Cited

U.S. PATENT DOCUMENTS

| | | | |
|---|---|---|---|
| 2014/0255608 A1* | 9/2014 | Eibon | C09D 133/00 |
| | | | 427/380 |
| 2014/0304199 A1* | 10/2014 | Chari | G06N 5/02 |
| | | | 706/12 |
| 2014/0365880 A1* | 12/2014 | Bellegarda | G06F 17/3097 |
| | | | 715/261 |
| 2015/0324701 A1* | 11/2015 | Park | G06N 20/00 |
| | | | 706/12 |
| 2016/0086185 A1 | 3/2016 | Adjaoute | |
| 2017/0213145 A1* | 7/2017 | Pathak | G06N 7/005 |
| 2018/0114139 A1* | 4/2018 | Kucera | G06N 99/005 |

OTHER PUBLICATIONS

"Payment card number", Wikipedia [retrieved from the internet on Mar. 8, 2017] https://en.wikipedia.org/wiki/Payment_card_number.
"Decision tree", Wikipedia [retrieved from the internet on Mar. 8, 2017] https://en.wikipedia.org/wiki/Decision_tree.

* cited by examiner

PREDICTIVE DATABASE FOR COMPUTER PROCESSES

TECHNICAL FIELD

The present invention generally relates to computer processes, and more particularly, to systems, methods, and computer program products for implementing a predictive database to improve the success rate of computer processes.

BACKGROUND

When requesting computer processes, users often have to enter several items of information for the computer processes to succeed. For example, depending on the type of computer process being requested by a user, the user may need to enter a name, an address, login information, payment information, and/or other items of information specific to the requesting user. If any of the required information is omitted and/or incorrectly entered by the user, the requested computer process may fail or produce an unintended outcome. Furthermore, the more items of information that a computer process requires a user to enter, the more likely that the user will omit and/or enter incorrect information that causes the computer process to be unsuccessful.

Accordingly, improved systems, methods, and computer program products are needed to predict user information and thereby improve the success rate of computer processes.

SUMMARY

In one exemplary embodiment, a method for implementing a predictive database for a computer process includes receiving, at one or more processors, historic input data that includes data objects entered for each of several successful computer processes requested by users. Thereafter, the method includes determining relationships based on the historic input data. Each of the relationships include a first one of the data objects entered for one of the successful computer processes linked to a second one of the data objects entered for the one successful computer process. The method further includes generating a decision tree based on the relationships, and filtering the decision tree based on an optimization threshold to reduce the decision tree. In addition, the method includes generating rules based on the filtered decision tree. Each of the rules includes a third data object linked to fourth data object, where for each rule, the third data object of the respective rule includes at least a portion of the first data object of one of the relationships, and the fourth data object of the respective rule includes the second data object of the one relationship. The method also includes storing the rules in the predictive database.

In addition, the method may include receiving partial input data entered by a user in relation to a request for the computer process. The partial input data may include the third data object of one of the rules. In response to the partial input data being received, the method may include retrieving the rules from the predictive database, determining the one rule from the retrieved rules based on the partial input data, and supplying the fourth data object of the one rule to the requested computer process.

Furthermore, the decision tree may include several paths, where each of the paths corresponds to one or more of the relationships. To this end, filtering the decision tree based on an optimization threshold to reduce the decision tree may include removing, from the decision tree, each path for which the number of the relationships corresponding thereto is less than the optimization threshold. Additionally or alternatively, each path may be associated with a probability that is based on the number of the relationships corresponding to the respective path and the total number of determined relationships. To this end, filtering the decision tree based on an optimization threshold to reduce the decision tree may include removing, from the decision tree, each path for which the probability associated therewith is less than the optimization threshold.

Moreover, the decision tree may include a first node and several second nodes linked to the first node, where each of the second nodes corresponds to a different one or more of the relationships. To this end, the first node may track the number of the relationships corresponding to each of the second nodes, and filtering the decision tree based on an optimization threshold to reduce the decision tree may include removing each second node for which the number of the relationships tracked by the first node is less than the optimization threshold. In addition or alternatively, the first node may track a probability for each second node that is based on the number of the relationships corresponding to the second node and the total number of relationships corresponding to all the second nodes. To this end, filtering the decision tree based on an optimization threshold to reduce the decision tree may include removing each second node for which the probability tracked by the first node is less than the optimization threshold.

In addition, one of the rules may include a fifth data object linked to the third data object of the one rule. The fifth data object may differ from the fourth data object of the one rule, and may include the second data object of a second one of the relationships. Moreover, the first data object of the second one of the relationships may include the third data object of the one rule. The one rule may also include a first probability associated with the fourth data object of the one rule and a second probability associated with the fifth data object of the one rule. The first probability may be greater than the second probability. To this end, the method may also include receiving partial input data entered by a user in relation to a request for the computer process, where the partial input data includes the third data object of the one rule. In response to the partial input data being received, the method may include retrieving the rules from the predictive database, and determining the one rule from the retrieved rules based on the partial input data. In response the one rule being determined, the method may also include determining the fourth data object of the one rule as a primary result and the fifth data object of the one rule as a secondary result based on the first probability and the second probability, and supplying the primary result to the requested computer process. After the primary result is supplied to the requested computer process, and in response to the requested computer process being unsuccessful, the method may further include supplying the secondary result to the requested computer process.

In another exemplary embodiment, a system for implementing a predictive database for a computer process includes one or more processors and a memory. The memory stores instructions that, upon execution by the one or more processors, cause the system to, in response to historic input data being received that includes data objects entered for each of several successful computer processes requested by users, determine relationships based on the historic input data. Each of the relationships include a first one of the data objects entered for one of the successful computer processes linked to a second one of the data objects entered for the one successful computer process. The instructions upon execution further cause the system to generate a decision tree based on the relationships, and filter the decision tree based on an optimization threshold to reduce the decision tree. Thereafter, the instructions upon execution cause the system to generate rules based on the filtered decision tree. Each of the rules include a third data object linked to a fourth data object, where for each rule, the third data object of the respective rule includes at least a portion of the first data object of a first one of the relationships, and the fourth data object of the respective rule includes the second data object of the first one of the relationships. The instructions upon execution also cause the system to store the rules in the predictive database.

The instructions of the memory upon execution may also cause the system to implement and/or perform any one or more of the features of the exemplary method described above.

In a further embodiment, a computer program product may include a non-transitory computer readable medium and instructions stored on the non-transitory computer readable medium. The instructions, upon execution by one or more processors of a system, cause the system to in response to historic input data being received that includes data objects entered for each of several successful computer processes requested by users, determine relationships based on the historic input data. Each of the relationships include a first one of the data objects entered for one of the successful computer processes linked to a second one of the data objects entered for the one successful computer process. The instructions upon execution further cause the system to generate a decision tree based on the relationships, and filter the decision tree based on an optimization threshold to reduce the decision tree. Thereafter, the instructions upon execution cause the system to generate rules based on the filtered decision tree. Each of the rules include a third data object linked to a fourth data object, where for each rule, the third data object of the respective rule includes at least a portion of the first data object of a first one of the relationships, and the fourth data object of the respective rule includes the second data object of the first one of the relationships. The instructions upon execution also cause the system to store the rules in the predictive database.

The instructions of the non-transitory computer readable medium upon execution may also cause the system to implement and/or perform any one or more of the features of the exemplary method described above.

The above summary may present a simplified overview of some embodiments of the invention in order to provide a basic understanding of certain aspects the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

Embodiments of the present invention will be understood and appreciated more fully from the following detailed description taken in conjunction with the drawings.

DETAILED DESCRIPTION

Several of the embodiments described herein relate to implementing a prediction database to improve the success rate of computer processes requested by users. In particular, these embodiments leverage input data entered by users in connection with successful computer processes to generate and store rules in the prediction database. Thereafter, when a user submits a request for a computer process, the user may only have to enter some of the user-specific input data that is necessary for the computer process to succeed. Based on the partial input data that is entered by the user, the rules may be utilized to determine additional user-specific input data that is necessary for the requested computer process. By reducing the amount of input data that must be entered by a user for a computer process, the embodiments improve the probability that the computer process will succeed.

Figure 1:
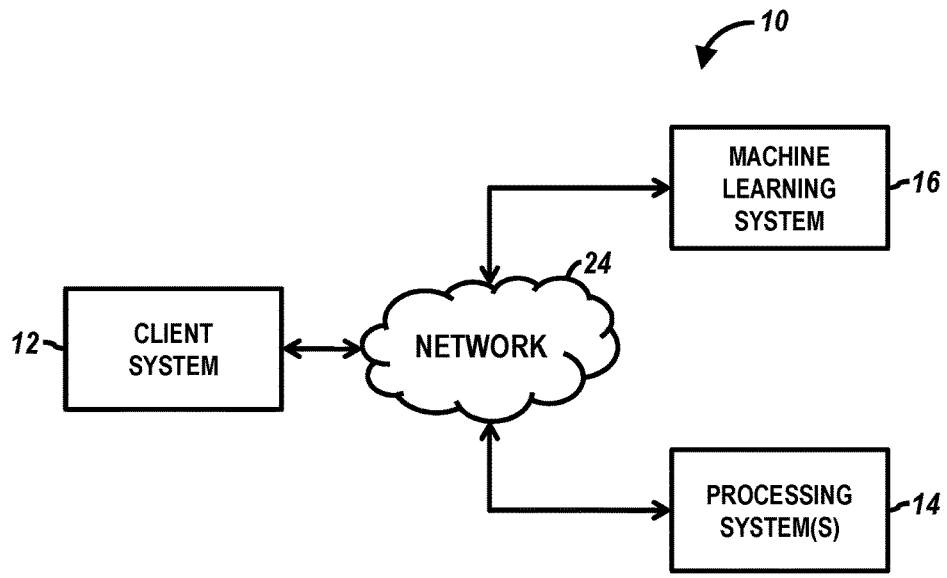
FIG. 1 is a schematic view of an exemplary operating environment that includes a plurality of systems for implementing a predictive database to improve the success rate of computer processes.

Turning now to the Figures, FIG. 1 illustrates an exemplary operating environment 10. Operating environment 10 may include a client system 12, one or more processing systems 14, and/or a machine learning system 16. Each of these systems may be communicatively enabled to communicate with one another via one or more networks 24, such as the Internet. Moreover, one or more of these systems may be integrated with one another. For example, the machine learning system 16 may be hosted on one or more of the processing systems 14.

The client system 12 may be an electronic device that enables a user to access remote information and services via the Internet. In particular, the client system 12 may include a browser and/or one or more apps that allow a user to access the processing systems 14, and thereby instruct the processing systems 14 to perform a computer process based on input data entered by the user. Non-limiting examples of a client system 12 include a desktop computer, a laptop computer, and a mobile electronic device such as a mobile phone or tablet.

The processing systems 14 may include systems that receive input data entered by a user, such as via the client system 12, and that perform or trigger computer processes requested by the user based on the received input data. For example, the processing systems 14 may include the systems of a merchant, which may be configured to sell goods and/or services to a user via the Internet. To this end, the input data entered by the user may include the user's payment information, such as the user's credit card data, for an online transaction. In response to receiving a user's payment information for a given online transaction, the merchant systems may be configured to initiate a computer process in which the user's payment information is authorized for the online transaction, such as by communicating the user's payment information to one or more bank-related systems over the Internet. Upon receiving a message indicating that the user's payment information is authorized for the online transaction, which may occur almost contemporaneously with the submission of the payment information to the merchant system, the merchant may then proceed to supply the purchased goods and/or services to the user, such as via preparing a shipment, creating a booking for the user, and so on.

In addition to merchant systems, the processing systems 14 may also include other systems involved in payment authorization and settlement processes. For example, the processing systems 14 may include the systems of a merchant's bank (i.e., the acquirer bank), the systems of a user's bank (i.e., the issuer bank), the systems of a credit association related to the user's payment information (e.g., VISA, AMERICAN EXPRESS, DISCOVER, MASTERCARD), and/or third-party systems that facilitate authorization and settlement processes on a merchant's behalf (e.g., clearinghouses, billing settlement plans, third-party payment platforms).

As previously described, in order to reduce the amount of input data that needs to be entered by a user for a computer process to be successful, and correspondingly to improve the success rate of the computer process, some of the processing systems 14 may be configured so as to enable a user to enter only some of the input data needed to successfully perform the computer process. For example, when requesting payment information from a user for an online transaction, a processing system 14 may be configured such that the user is able to enter partial credit card information only. Specifically, the processing system 14 may present the user with a graphical user interface (GUI) that includes fields for entering certain credit card details, such as a credit card number, and that omits fields for entering other credit card details, such as the credit card type (e.g., VISA, AMERICAN EXPRESS, DISCOVER, MASTERCARD). Because the omitted credit card details may be necessary for the processing systems 14 to successfully perform a computer process for the online transaction (e.g., an authorization or settlement process), the processing systems 14 may need to somehow determine the omitted details before proceeding to perform the computer process.

A conventional approach for determining the omitted details is to retrieve and consolidate tables from third parties that link potential partial input data for a computer process to other input data that is necessary for the computer process to succeed. However, this approach has drawbacks. For example, the tables have to be periodically maintained and updated, which requires sending repeated requests to the third parties. Moreover, the retrieved tables may be incomplete and/or unreliable relative to the potential partial input data that may be entered by a user, which may cause many computer processes to be unsuccessful.

In order to overcome the drawbacks of the conventional approach, the machine learning system 16 may be configured to determine a set of rules based on historic input data entered by users for a plurality of successful computer processes. In particular, the machine learning system 16 may generate the rules based on relationships derived from the historic input data, and store the rules in a predictive database. In general, a successful computer process may include a computer process that finishes as intended by the user, without errors and/or without rejections of the user's entered input data (e.g., invalid login information, invalid credit card information). Accordingly, the relationships derived from input data entered by users in connection with successful computer processes are typically quite reliable, and therefore serve as a good basis for determining the rules. Once determined and stored, the rules may be utilized by the machine learning system and/or processing systems 14 to determine additional input data that is omitted from partial input data entered by a user in connection with a requested computer process, and that is necessary for the processing systems 14 to successfully perform the requested computer process.

Figure 2:
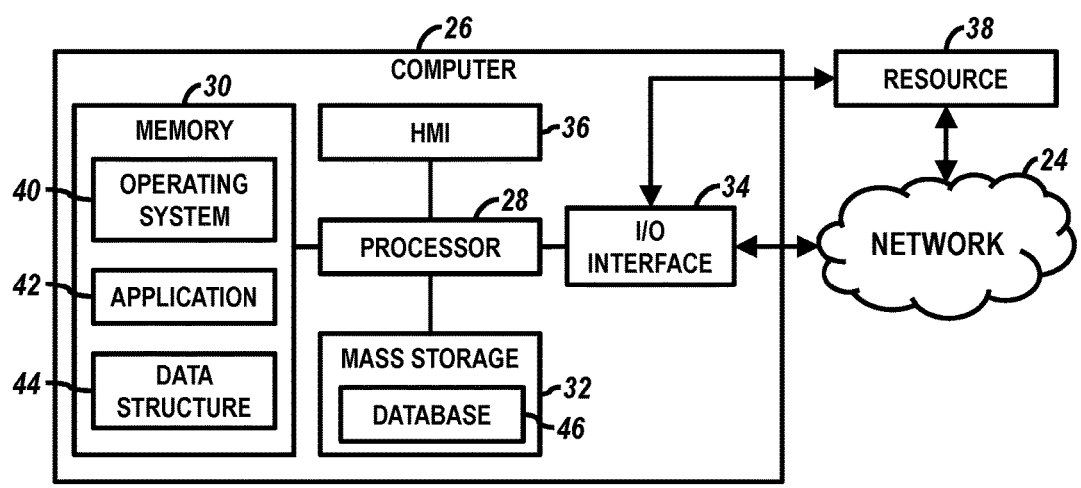
FIG. 2 is a schematic view of an exemplary computer system in FIG. 1.

Referring now to FIG. 2, the client system 12, the processing systems 14, and the machine learning system 16 may be implemented on one or more computer devices or systems, such as exemplary computer system 26. The computer system 26 may include a processor 28, a memory 30, a mass storage memory device 32, an input/output (I/O) interface 34, and a Human Machine Interface (HMI) 36. The computer system 26 may also be operatively coupled to one or more external resources 38 via the network 24 or I/O interface 34. External resources may include, but are not limited to, servers, databases, mass storage devices, peripheral devices, cloud-based network services, or any other suitable computer resource that may be used by the computer system 26.

The processor 28 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 30. The memory 30 may include a single memory device or a plurality of memory devices including, but not limited, to read-only memory (ROM), random access memory (RAM), volatile memory, non-volatile memory, static random access memory (SRAM), dynamic random access memory (DRAM), flash memory, cache memory, or any other device capable of storing information. The mass storage memory device 32 may include data storage devices such as a hard drive, optical drive, tape drive, non-volatile solid state device, or any other device capable of storing information.

The processor 28 may operate under the control of an operating system 40 that resides in the memory 30. The operating system 40 may manage computer resources so that computer program code embodied as one or more computer software applications, such as an application 42 residing in memory 30, may have instructions executed by the processor 28. In an alternative embodiment, the processor 28 may execute the application 42 directly, in which case the operating system 40 may be omitted. One or more data structures 44 may also reside in memory 30, and may be used by the processor 28, operating system 40, or application 42 to store or manipulate data.

The I/O interface 34 may provide a machine interface that operatively couples the processor 28 to other devices and systems, such as the network 24 or the one or more external resources 38. The application 42 may thereby work cooperatively with the network 24 or the external resources 38 by communicating via the I/O interface 34 to provide the various features, functions, applications, processes, or modules comprising embodiments of the invention. The application 42 may also have program code that is executed by the one or more external resources 38, or otherwise rely on functions or signals provided by other system or network components external to the computer system 26. Indeed, given the nearly endless hardware and software configurations possible, persons having ordinary skill in the art will understand that embodiments of the invention may include applications that are located externally to the computer system 26, distributed among multiple computers or other external resources 38, or provided by computing resources (hardware and software) that are provided as a service over the network 24, such as a cloud computing service.

The HMI 36 may be operatively coupled to the processor 28 of computer system 26 in a known manner to allow a user to interact directly with the computer system 26. The HMI 36 may include video or alphanumeric displays, a touch screen, a speaker, and any other suitable audio and visual indicators capable of providing data to the user. The HMI 36 may also include input devices and controls such as an alphanumeric keyboard, a pointing device, keypads, push-buttons, control knobs, microphones, etc., capable of accepting commands or input from the user and transmitting the entered input to the processor 28.

A database 46 may reside on the mass storage memory device 32, and may be used to collect and organize data used by the various systems and modules described herein. The database 46 may include data and supporting data structures that store and organize the data. In particular, the database 46 may be arranged with any database organization or structure including, but not limited to, a relational database, a hierarchical database, a network database, or combinations thereof. A database management system in the form of a computer software application executing as instructions on the processor 28 may be used to access the information or data stored in records of the database 46 in response to a query, where a query may be dynamically determined and executed by the operating system 40, other applications 42, or one or more modules.

Figure 3:
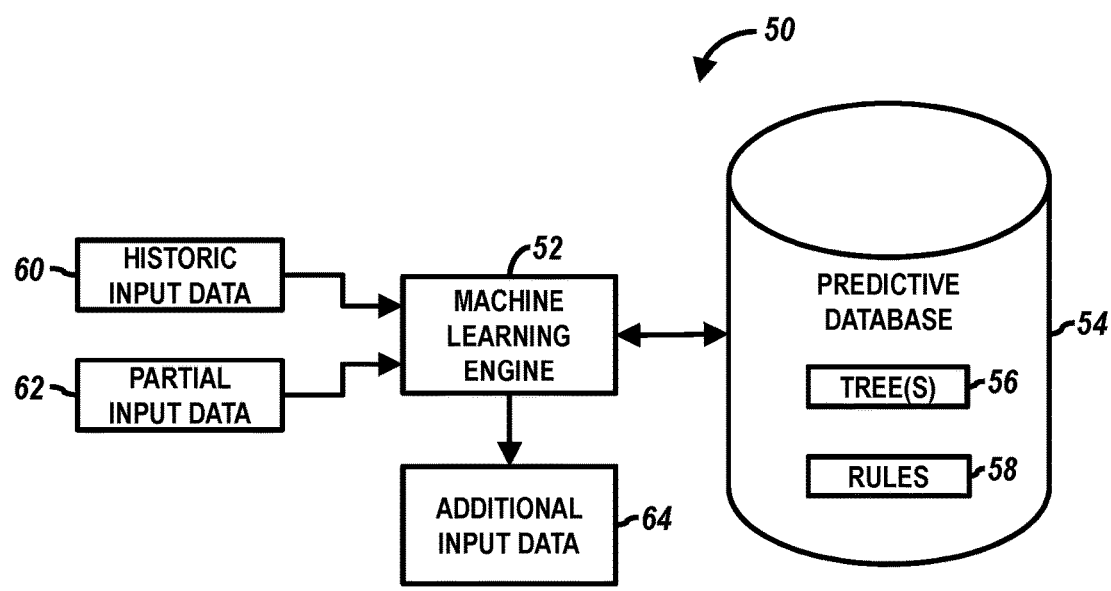
FIG. 3 is a schematic view of an exemplary processing architecture that may be implemented by one or more of the computer systems of FIG. 1.

FIG. 3 illustrates a processing architecture 50 that may be provided by one or more of the systems of operating environment 10. Processing architecture 50 may include a machine learning engine 52 and a predictive database 54. The predictive database 54 may store one or more decision trees 56 and/or a plurality of rules 58, which are discussed in further detail below.

In operation, the machine learning engine 52 may receive historic input data 60, which may include input data entered by users in connection with a plurality of successful computer processes. More particularly, the historic input data 60 may include a plurality of data objects entered by the users for the successful computer processes. In response to receiving the historic input data 60, the machine learning engine 52 may be configured to generate a plurality of rules 58 based thereon. Specifically, the machine learning engine 52 may be configured to determine relationships based on the historic input data 60, generate a decision tree 56 based on the relationships, filter the decision tree 56 in a manner that realizes computer resource savings while maintaining the integrity of the decision tree 56, and then generate the rules 58 based on the filtered decision tree 56. Each of the rules 58 may include at least part of a data object of the historic input data 60 linked to another one of the data objects of the historic input data 60 in accordance with one of the relationships. The machine learning engine 52 may then store the rules 58 in the predictive database 54.

After the rules 58 have been generated and stored, the machine learning engine 52 may receive partial input data 62, which may have been entered by a user in connection with a request for a computer process. The requested computer process, however, may require additional input data 64, which was not entered by the user, in addition to the partial input data 62 to succeed. Thus, in response to receiving the partial input data 62, the machine learning engine 52 may retrieve the rules 58 from the predictive database 54, and determine the additional input data 64 needed for the requested computer process based on the partial input data 62 and the rules 58. Thereafter, the machine learning engine 52 may supply the additional input data 64 to or for the requested computer process.

Figure 4:
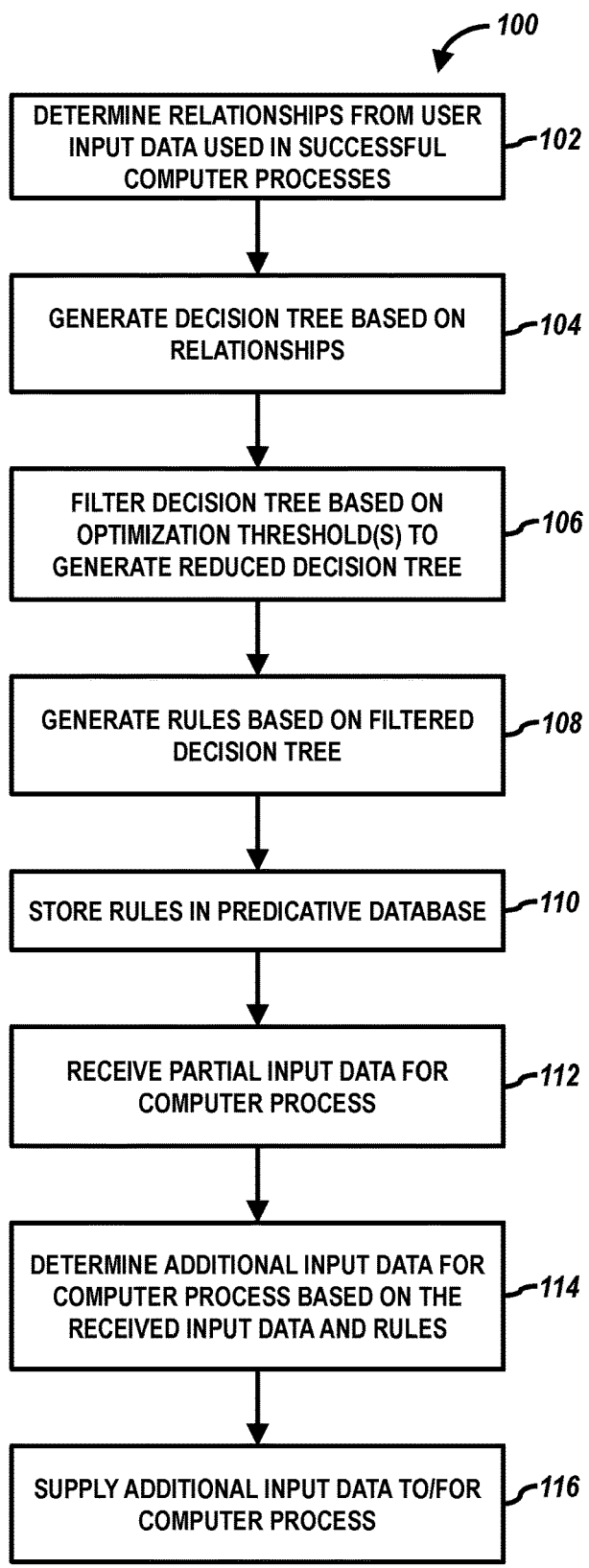
FIG. 4 is a flowchart of an exemplary process for implementing and utilizing a predictive database that may be performed by the processing architecture of FIG. 3.

FIG. 4 illustrates an exemplary process 100 for generating the rules 58 and processing partial input data 62 entered by a user in connection with a requested computer process. The process 100 may be performed by the machine learning engine 52 of the processing architecture 50.

In block 102, a plurality of relationships may be determined from input data entered by users for successful computer processes that were requested by the users. In particular, the machine learning engine 52 may receive historic input data 60, which may include data objects entered by the users for the computer processes. For each of the successful computer processes, the historic input data 60 may include a set (i.e., two or more) of data objects that were entered by a user for the computer process, and that may have been necessary for the computer process to succeed. For example, in one embodiment, the historic input data 60 may include payment information entered by users for several successful online transactions. In this case, the data objects included in the historic input data 60 for each successful online transaction may include the items of the payment information that were entered by a user for the online transaction, where each of the items may have been necessary for the user's payment information to be processed. Specifically, the data objects included in the historic input data 60 for each online transaction may include a credit card number and a credit card type (e.g., VISA, AMERICAN EXPRESS, DISCOVER, MASTERCARD) entered by the user for the online transaction.

In some embodiments, and possibly due to security concerns and/or regulations, a data object entered by a user for a successful computer process that is included in the historic input data 60 may include only a portion of a larger item that was entered by the user for the successful computer process. For example, when the historic input data 60 includes user-entered payment information for online transactions, one of the user-entered data objects that is included in the historic input data 60 for each online transaction may include a portion of a credit card number that was entered by a user for the online transaction, such as the Bank Identification Number (BIN) portion of the credit card number, which is usually a sequence of digits at the beginning of the credit card number.

The historic input data 60 received at the machine learning engine 52 may be collected over a period of time, such as over six months. Consequently, the size of the historic input data 60 received by the machine learning engine 52 may be quite large. For example, one month of payment information passed through a given payment platform in connection with successful online transactions may generate tens of millions of entries in the historic input data 60 alone.

In some embodiments, the historic input data 60 may include sets of data objects entered by users in connection with successful computer processes and sets of data objects entered by users in connection with unsuccessful computer processes. In these cases, in response to receiving the historic input data 60, the machine learning engine 52 may be configured to filter the historic input data 60 to discard those sets of data objects that resulted in unsuccessful computer processes. In this way, after the filtering is completed, the machine learning engine 52 may be left with historic input data 60 that includes only the sets of data objects that resulted in successful computer processes. For example, when the historic input data 60 includes payment information, filtering the historic input data 60 may discard any user-entered payment information that failed to be authorized for a given online transaction, and thereby may retain only the user-entered payment information which was authorized and approved by all of the parties involved in a given online transaction (e.g., merchant, banks, third-party payment service provider, fraud checker, credit card association).

In response to receiving (and possibility filtering) the historic input data 60, the machine learning engine 52 may determine the relationships based thereon. Each of the relationships may include a data object of one of the sets of data objects included in the historic input data 60 (hereinafter referred to as the A data object) linked to another data object of the same set (hereinafter referred to as the B data object). For example, when the historic input data 60 includes payment information entered by users, the relationships determined from the historic input data 60 may include the following:

TABLE 1

| Relationship # | BIN (A Data Object) | CC Type (B Data Object) |
| --- | --- | --- |
| 1 | 348540 | DI |
| 2 | 349759 | AX |
| 3 | 414720 | VI |
| 4 | 414751 | AX |
| 5 | 415274 | CA |
| 6 | 416563 | VI |
| 7 | 417834 | VI |
| 8 | 424950 | VI |
| 9 | 424960 | DI |
| 10 | 425942 | AX |
| 11 | 438782 | VI |
| 12 | 540489 | CA |

As shown in the embodiment represented by Table 1, each relationship may include the BIN portion of a credit card number (i.e., A data object) and a credit card type (i.e., B data object) entered by a user in a successful online transaction. For example, the relationship three of Table 1 indicates that a user entered a credit card number starting with "414720" and a credit card type of "VI" as payment information for a successful online transaction. Although Table 1 depicts each of the determined relationships as being unique, in typical embodiments, several of the determined relationships may include duplicates.

In block 104, a decision tree 56 may be generated based on the determined relationships. In particular, the machine learning engine 52 may feed each of the determined relationships into a decision tree template, and thereby build the decision tree 56 based thereon. The decision tree 56 may generally track which A data objects, or portions thereof, are commonly associated with which B data objects in the input data entered by users for a type of successful computer process (e.g., an online transaction). For example, referring to Table 1, the decision tree 56 may track which BIN's are typically associated with which credit card types in successful online transactions.

Figure 5:
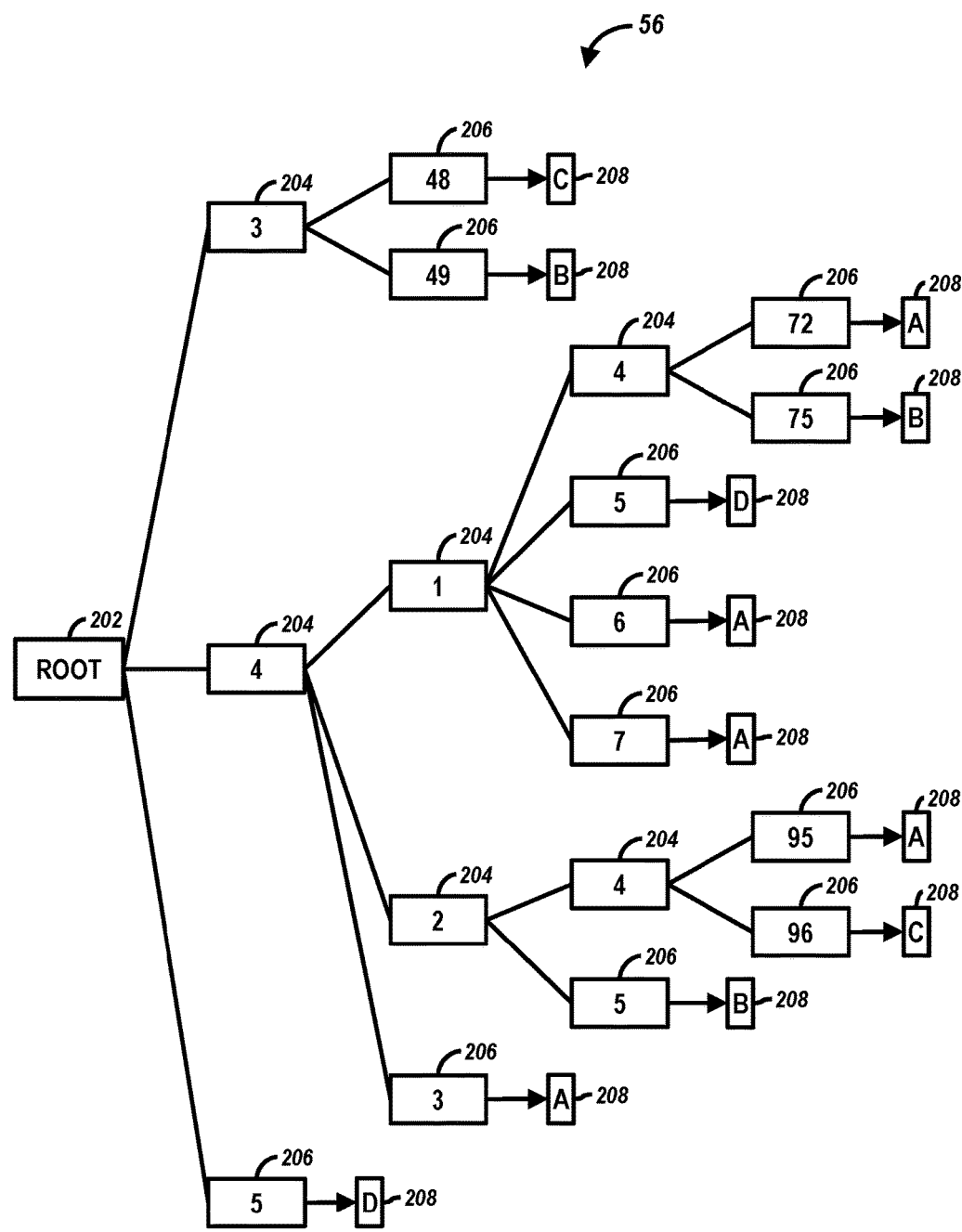
FIG. 5 is a schematic view of an exemplary decision tree that may be generated by the processing architecture of FIG. 3 while performing the process of FIG. 4.

FIG. 5 illustrates an exemplary decision tree 56 generated based on the relationships in Table 1. As shown in the illustrated embodiment, the decision tree 56 may include a plurality of nodes that form a plurality of paths, such that each path includes a plurality of nodes. In particular, the decision tree 56 may include a root node 202, a plurality of intermediary nodes 204 linked to the root node 202, and a plurality of leaf nodes 206 linked to the intermediary nodes 204 and/or the root node 202. Each of the leaf nodes 206 may be associated with one or more elements 208.

A path of the decision tree 56 may start at the root node 202, end at one of the leaf nodes 206, and include the one or more intermediary nodes 204 therebetween. Although each path may include only one of the elements 208, two or more paths may share one or more nodes of the decision tree 56, or may include all the same nodes. To that end, a node of the decision tree 56 may be part of one or more paths. However, because each path may only flow from a parent node to a child node, nodes of the same level (i.e., nodes that are an equal distance of links away from the root node 202) may each be part of a different one or more paths. For example, because the intermediary node 204 linked to the root node 202 and labeled "4" is a parent to three child nodes, the intermediary node 204 labeled "4" may be part of at least three paths, and each of the child nodes may be part of a different one or more paths.

Each node of the decision tree 56 (minus the root node 202) may represent a unit (e.g., a number, letter, character, or word) or a sequence of units that begins the A data object of one or more of the determined relationships. To this end, each node may correspond to one or more of the relationships, and each child node of a parent node may correspond to a different one or more of the relationships. For a given node, the unit or the sequence of units represented by that node may be the sequence of labels of the nodes (minus the root node 202) that lead to the given node, if any, followed by the label of the given node. For example, the intermediary node 204 labeled "3" may represent the unit "3", and may correspond to relationships one and two of Table 1. The leaf node 206 labeled "48", which is a child node of the intermediary node 204 labeled "3", may represent the sequence "348" and correspond to relationship one of Table 1, and the leaf node 206 labeled "49", which is also a child node of the intermediary node 204 labeled "3", may represent the sequence "349" and may correspond to relationship two of Table 1.

Correspondingly, each the paths of the decision tree 56, which include one or more of the nodes of the decision tree 56, may correspond to a different set of one or more relationships, where each of the corresponding relationships include the same A data object linked to the same B data object. More particularly, for each path of the decision tree 56, the nodes of the path may represent a unit or a sequence of units that begins the A data object of the set of relationships to which the path corresponds, and the element 208 of the path may represent the B data object of the set of relationships to which the path corresponds. For example, one path illustrated in the decision tree 56 includes an intermediary node 204 labeled "3" followed by a leaf node 206 labeled "48", which is associated with the element 208 representative of "DI". This path corresponds to relationship one in Table 1, and indicates that credit card numbers starting with "348" are commonly associated with "DI" type credit cards.

To build the decision tree 56, the machine learning engine 52 may be configured to select one of the determined relationships, and thereafter separate the A data object of the selected relationship into units. For example, when the A data object is a sequence of numbers, each unit may include one of the numbers in the sequence. Thereafter, the machine learning engine 52 may feed the first unit of the A data object into an empty decision tree, which may only include the root node 202, by generating a new leaf node 206 that is labeled with the first unit and that is linked to the root node 202, and associating the new leaf node 206 with an element 208 that represents the B data object of the selected relationship.

Thereafter, the machine learning engine 52 may select a new one of the determined relationships to feed into the decision tree. Similar to the previously selected relationship, the machine learning engine 52 may separate the A data object of the newly selected relationship into units. The machine learning engine 52 may then proceed to determine whether the root node 202 is already the parent node to a child node that is labeled with the first unit of the A data object of the newly selected relationship. If not, then the machine learning engine 52 may generate a new leaf node 206 that is labeled with the first unit and that is linked to the root node 202, and associate the new leaf node 206 with an element 208 that represents the B data object of the newly selected relationship.

Conversely, if the root node 202 is already a parent node to a child node that is labeled with the first unit of the A data object of the newly selected relationship, then the machine learning engine 52 may proceed to determine whether the node that is labeled with the first unit is a parent node to a child node that is labeled with the next unit of the A data object of the newly selected relationship. If not, then the machine learning engine 52 may generate a new leaf node 206 that is labeled with the next unit and that is linked to the node labeled with the first unit of the A data object of the newly selected relationship, and may associate the new leaf node 206 with an element 208 that represents the B data object of the newly selected relationship. Alternatively, if the node labeled with the first unit of the A data object of newly selected relationship is already the parent node to a child node that is labeled with the next unit of the A data object of the newly selected relationship, then the machine learning engine 52 may proceed to consider the following unit of the A data object of the newly selected relationship and repeat the above process. After a leaf node 206 has been created and associated to the B data object of the newly selected relationship, the machine learning engine 52 may proceed to select and feed each of the remaining relationships into the decision tree in accordance with the above-described algorithm.

In some embodiments, if while feeding a selected relationship into the decision tree, the machine learning engine 52 comes to a leaf node 206, then the machine learning engine 52 may determine whether the leaf node 206 is associated with an element 208 that represents the B data object of the selected relationship. If so, then the machine learning engine 52 may proceed to select a different relationship, as the currently selected relationship is already represented by a path of the decision tree. Conversely, if the leaf node 206 is associated with an element 208 that fails to represent the B data object of the selected relationship, then the machine learning engine 52 may convert the leaf node 206 into an intermediary node 204, and generate two or more leaf nodes 206 linked to the converted intermediary node 204. One of the new leaf nodes 206 may correspond to the selected relationship, and each the other new leaf nodes 206 may correspond to one of the relationships that previously resulted in the converted intermediary node 204. To this end, each of the new leaf nodes 206 may be labeled with the minimum units needed to differentiate the A data object of the relationship corresponding to the leaf node 206 from the A data objects of the relationships corresponding to the other new leaf nodes 206 after the unit or sequence of units represented by the converted intermediary node 204. An example of this process is provided below in reference to FIGS. 6 and 7.

In some cases, however, it may not be possible to label new leaf nodes 206 so as differentiate between two different relationships, such as when two of the relationships include the same A data object and different B data objects. This may occur, for example, when the historic input data 60 becomes corrupted. In this case, a single leaf node 206 may be generated for the two different relationships, and may thereafter be associated with multiple elements 208, each of which may represent one of the B data objects of the two different relationships. However, when the decision tree 56 is subsequently filtered, which is described in further detail below, the element 208 that represents the B data object associated with the corrupted relationship may be discarded.

In some embodiments, as the decision tree 56 is built, the machine learning engine 52 may track the number of relationships to which each path corresponds. In other words, for each path, the machine learning engine 52 may track and/or include an indication of the number of relationships that include an A data object beginning with the unit or the sequence of units represented by the nodes of the path, and include a B data object that is represented by the element 208 of the path. In this way, the machine learning engine 52 may also track and/or include a probability for each path that is based on the ratio between the number of relationships that correspond to the path and the total number of determined relationships. This data may be used to filter the decision tree 56, which is described in more detail below.

Additionally or alternatively, a given parent node in the decision tree 56 may track and/or include an indication of the number of relationships corresponding to each child node of the parent node. In particular, for each child node of the parent node, the parent node may track and/or include an indication of the number of relationships having an A data object that begins with the unit or sequence of units represented by the child node. In this way, the parent node may also track and/or include a probability for each child node that is based on the ratio between the number of relationships corresponding to the child node, and the total number of relationships that correspond to all of the child nodes of the parent node. This information may also be utilized by the machine learning engine 52 to filter the decision tree 56, which is described further detail below.

Similarly, for each element 208 linked to a leaf node 206, the leaf node 206 may track and/or include an indication of the number of relationships that correspond to the element 208 (i.e., the number of relationships that include an A data object beginning with the unit or sequence of units represented by the leaf node 206 linked to the B data object that is represented by the element 208). The leaf node 206 may also track and/or include a probability for each of the elements 208 linked thereto that is based on the ratio between number of relationships corresponding to the element 208 and the total number of relationships corresponding to all the elements 208 linked to the leaf node 206. This information may likewise be utilized by the machine learning engine 52 to filter the decision tree 56, which is described further detail below.

Figure 6:
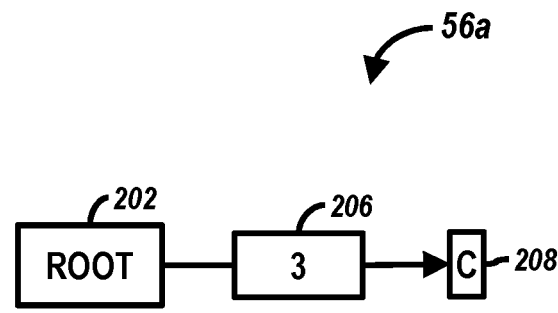
FIG. 6 is a schematic view of an exemplary partial decision tree that may be generated by the processing architecture of FIG. 3 while performing the process of FIG. 4.
Figure 7:
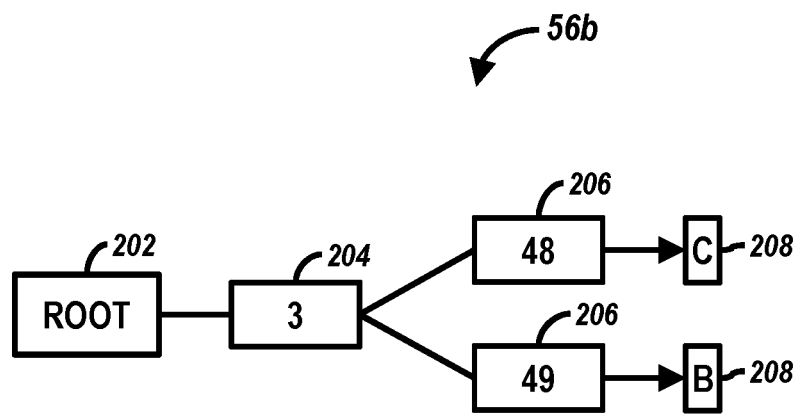
FIG. 7 is a schematic view of a further exemplary partial decision tree that may be generated by the processing architecture of FIG. 3 while performing the process of FIG. 4.

FIGS. 6 and 7 illustrate partial decision trees that may be generated while building the decision tree 56 for Table 1. To begin, the machine learning engine 52 may select relationship one to feed into an empty decision tree, which may only include the root node 202. Thereafter, the machine learning engine 52 may divide the A data object of relationship one, namely the BIN, into a sequence of units, namely 3-4-8-5-

4-0. The machine learning engine 52 may then feed the first unit of the sequence of units, in this case "3", into the empty decision tree by generating a leaf node 206 labeled "3" that is linked to the root node 202, and thereafter associating the leaf node 206 to the B data object of relationship one, which in this case is "DI". FIG. 6 illustrates a partial decision tree 56*a* that results after relationship one of Table 1 is fed into the empty decision tree.

Thereafter, the machine learning engine 52 may select relationship two of Table 1 to be fed into the partial decision tree 56*a*. To this end, the machine learning engine 52 may separate the A data object of relationship two into a sequence of units, namely 3-4-9-7-5-9, and proceed to feed the first unit, in this case "3", into the partial decision tree 56*a*. Upon feeding the unit "3" into the partial decision tree 56*a*, the machine learning engine 52 may determine that the root node 202 is a parent to a child node labeled "3", and further that the child node labeled "3" is a leaf node 206. Moreover, the machine learning engine 52 may check whether the node labeled "3" is already associated with an element 208 that represents the B data object of relationship two. Because it is not, the machine learning engine 52 may convert the node labeled "3" to an intermediary node 204, and generate two new leaf nodes 206 linked to the converted intermediary node 204. Each new leaf node 206 may be labeled with the minimum units needed to differentiate the A data object of relationship one from the A data object of relationship two after the unit or sequence of units represented by the converted intermediary node 204. In this case, the minimum units needed include "48" for relationship one and "49" for relationship two. Accordingly, the machine learning engine 52 may label one of the new leaf nodes 206 as "48" and associated it with the B data object of relationship one, namely "DI", and may label the other new leaf node 206 as "49" and associate it with the B data object of relationship two, namely "AX". FIG. 7 illustrates a partial decision tree 56*b* after relationship two is fed into the partial decision tree 56*a*.

Referring again to FIG. 4, in block 106, the decision tree 56 may be filtered based on one or more optimization thresholds to reduce the decision tree 56. Filtering the decision tree 56 may include one filtering technique or a combination of filtering techniques. For example, in some embodiments, filtering the decision tree 56 may be based on the numbers tracked by the machine learning engine 52 for each of the paths. Specifically, filtering the decision tree 56 may include removing from the decision tree 56 each path for which the number of relationships corresponding thereto is less than an optimization threshold. Additionally or alternatively, filtering the decision tree 56 may include removing from the decision tree 56 each path for which the probability associated therewith is less than an optimization threshold. In other words, one optimization threshold utilized to filter the decision tree 56 may be a minimum number of relationships that a path needs to correspond to, and/or another optimization threshold utilized to filter the decision tree 56 may be a minimum probability that a path needs to meet or exceed.

Furthermore, filtering the decision tree 56 may be based on the numbers stored by one or more of the parent nodes of the decision tree 56. Specifically, for a given parent node, filtering the decision tree 56 may include removing each child node of the parent node for which the number of relationships tracked by the parent node is less than an optimization threshold. Additionally or alternatively, filtering the decision tree 56 may include removing each child node for which the probability tracked by the parent node is less than an optimization threshold. In other words, one optimization threshold utilized to filter the decision tree 56 may be a minimum number of relationships that a node need to correspond to, and/or another optimization threshold utilized to filter the decision tree 56 may be a minimum probability that a node needs to meet or exceed.

Filtering the decision tree 56 may also include removing each element 208 for which the number of relationships and/or probability, as tracked by the leaf node 206 associated with the element 208, is less than an optimization threshold.

The above filtering techniques generally function to improve the integrity of the decision tree 56 while also realizing improved computer resource utilization. In particular, by filtering the decision tree 56 based on a number of corresponding relationships and/or probability as described above, the machine learning engine 52 may remove those paths and/or nodes representing erroneous relationships. Specifically, because erroneous relationships are generally in small numbers as compared to the accurate relationships, the above filtering techniques will remove from the decision tree 56 nodes and/or paths that correspond to the erroneous relationships, while retaining the accurate relationships. Moreover, because the historic input data 60, and correspondingly the number of relationships derived therefrom, may be quite large, it makes sense to trust relationships only after a minimum set of occurrences of the relationship has been reached, such as by utilizing the above filtering techniques.

Furthermore, not only does reducing the decision tree 56 free up system resources, such as memory, but it also improves response time when the generating the additional input data 64. Specifically, the smaller the decision tree 56, the smaller the set of rules 58 generated from the decision tree 56, and ultimately, the faster the machine learning engine 52 is able to determine the additional data 64 in response to receiving the partial input data 62. For example, relative to a decision tree 56 derived from sample data relating to a plurality of online transactions, utilization of the above-described filtering techniques, namely probability filtering, has been shown to reduce memory consumption by multiple percentage points while having an insignificant effect on accuracy. Correspondingly, utilizing one or more of the above filtering techniques, namely probability filtering, has been shown to reduce the number of rules 58 generated from the decision tree 56 from thousands to about one hundred or less.

Once generated and/or filtered, the decision tree 56 may be stored in the predictive database 54. In this way, when further historic input data 60 is received, the machine learning engine 52 may retrieve the decision tree 56 from the predictive database 54, and may proceed to feed relationships derived from the further historic input data 60 into the decision tree 56 and thereby update the decision tree 56. Thereafter, the machine learning engine 52 may filter the now-updated decision tree 56 using one or more of the above techniques, and then proceed to generate rules 58 as described below.

In block 108, rules 58 may be generated from the decision tree 56. Each of the rules 58 may include a test that comprises at least a portion of an A data object of one of the relationships (hereinafter referred to as a C data object) linked to the B data object of the one relationship (hereinafter referred to as a D data object). In general, each rule 58 may correspond to one of the paths of the decision three 56. For example, the following table illustrates a list of rules 58 that may be generated from the decision tree 56 of FIG. 5:

TABLE 2

| Rule # | Test (C Data Object) | B Data Object (D data object) |
|---|---|---|
| 1 | Starts with "348" | DI |
| 2 | Starts with "349" | AX |
| 3 | Starts with "41472" | VI |
| 4 | Starts with "41475" | AX |
| 5 | Starts with "415" | CA |
| 6 | Starts with "416" | VI |
| 7 | Starts with "417" | VI |
| 8 | Starts with "42495" | VI |
| 9 | Starts with "42496" | DI |
| 10 | Starts with "425" | AX |
| 11 | Starts with "43" | VI |
| 12 | Starts with "5" | CA |

In block 110, once the rules 58 are generated, the rules 58 may be stored in the predictive database 54. In particular, the machine learning engine 52 may insert the rules 58 into a file and store the file in the predictive database 54.

In some embodiments, the rules 58 may be generated and placed in the file in a specific order so as to enable further consolidation the rules 58, and thereby further reduce the memory footprint of the rules 58 stored in the predictive database 54. Moreover, the fewer rules 58 that are stored in the predictive database 54, the faster response time of the machine learning engine 52 when determining the additional input data 64. For example, when generating the rules 58 from a decision tree 56, the machine learning engine 52 may be configured to group the paths that share at least one node besides the root node 202. Thereafter, for each group of paths, the machine learning engine 52 may be configured to determine the element 208 that is included in the most paths of the group. If there is a tie, the machine learning engine 52 may select any one of the elements 208 in the tie. The machine learning engine 52 may then consolidate the paths of the group that include the determined element 208 into one rule 58 that links the unit represented by the highest-level shared node of the group to the B data object represented by the determined element 208, and ensure that the consolidated rule 58 is listed after any other rules 58 generated for the remaining paths in the group.

For example, referring to the decision tree 56 of FIG. 5, the machine learning engine 52 may group each of the paths that share the intermediary node 204 linked to the root node 202 and labeled "4". Thereafter, the machine learning engine 52 may determine that the most occuring element 208 in the group represents "VI". Accordingly, the machine learning engine 52 may consolidate the paths of the group that include the element 208 that represents "VI" into a single rule 58 that links the unit represented by the highest-level shared node, in this case the intermediary node 204 labeled "4", to the element of "VI". The consolidated rule 58 may then be placed below the other rules 58 generated for the group of paths in the list of rules 58.

Referring again to the decision tree 56 of FIG. 5, the machine learning engine 52 may be configured to generate the following ordered table of rules 58 for storage in the predictive database 54:

TABLE 3

| Rule # | Test (C Data Object) | B Data Object (D data object) |
|---|---|---|
| 1 | Starts with "348" | DI |
| 2 | Starts with "3" | AX |
| 3 | Starts with "41475" | AX |
| 4 | Starts with "415" | CA |
| 5 | Starts with "42496" | DI |
| 6 | Starts with "425" | AX |
| 5 | Starts with "4" | VI |
| 6 | Starts with "5" | CA |

As shown in Table 3, generating the rules 58 from the decision tree 56 of FIG. 5 as an ordered list may enable the number of rules 58 to be reduced from twelve to six.

As previously described, some of the leaf nodes 206 in a decision tree 56, even after the decision tree 56 has been filtered and reduced, may be associated with two or more elements 208, each being part of a different path. In this case, when generating the rules 58 based on the decision tree 56, the machine learning engine 52 may consolidate each path sharing a leaf node 206 but including different elements 208 into a single rule 58 that includes one C data object and multiple D data objects. In particular, the C data object of the rule 58 may be the unit or sequence of units represented by the nodes of each of the paths sharing the leaf node 206, and each of the D data objects of the single rule 58 may be the B data object represented by one of the elements 208 associated with the shared leaf node 206. In other words, each of the D data objects of the single rule 58 may correspond to at least one relationship, where all of the relationships corresponding to the D data objects may include an A data object beginning with the C data object of the single rule 58, and the at least one relationship corresponding to each of the D data objects may include a B data object that differs from the B data object of the at least one relationship corresponding to the other D data objects.

When a single rule 58 is generated that includes multiple D data objects, the machine learning engine 52 may also assign a probability to each of the D data objects within the rule 58. In other words, the rule 58 may include a probability associated with each D data object. The probability associated with a given D data object of a rule 58 may be equal to the probability tracked by the leaf node 206 for the element 208 that represents the D data object. In this way, in response to receiving partial input data 62 in connection with a requested computer process that includes the C data object of the single rule 58, the machine learning engine 52 may be configured to return the D data object of the rule 58 having the highest probability as a primary result, and return the D data object having the next highest probability as a secondary result, and so on. The machine learning engine 52 may then be configured to supply the primary result as the additional input data 64 to or for the requested computer process. If the computer process is unsuccessful, then the machine learning engine 52 may then be configured to supply the secondary result as the additional input data 64 to or for the computer process Referring again to FIG. 4, in block 112, after the rules 58 have been generated and stored in the predictive database 54, partial input data 62 may be received, such as at the machine learning engine 52. In particular, the partial input data 62 may have been entered by a user in relation to a request for a computer process, such as a verification of payment information for an online transaction, and may satisfy the C data object of one of the rules 58. However, the partial input data 62 may omit other user data, herein referred to as additional input data 64, that is necessary for the requested computer process to succeed. For example, the partial input data 62 may include at least a portion of a credit card number, and omit a credit card type associated with the credit card number.

Thus, in block 114, in response to receiving the partial input data 62, the additional input data 64 may be determined for the requested computer process based on the partial input data 62 and the rules 58 stored in the predictive database 54. In particular, the machine learning engine 52 may retrieve the list of rules 58 from the predictive database 54, and thereafter compare the partial input data 62 with the C data object of one or more of the rules 58 to determine a match (i.e., when the partial input data 62 satisfies the test of a rule 58). This comparison may occur based on the order of the rules 58, meaning that the machine learning 52 may compare the partial input data 62 with the first listed rule 58, the next listed rule 58, and so on until a match is found.

Upon the machine learning engine 52 determining a matching rule 58, if the matching rule 58 includes only one D data object, the machine learning engine 52 may determine that the D data object of the matching rule 58 is the additional input data 64. Alternatively, if the matching rule 58 includes multiple D data objects, the machine learning engine 52 may determine a primary result and a secondary result as described above. Thereafter, in block 116, the machine learning engine 52 may supply the additional input data 64 to or for the computer process requested by the user. For example, the machine learning engine 52 may forward the additional input data 64 directly to the requested computer process, or to a processing system 14 that will facilitate or trigger the computer process.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer readable storage medium having computer readable program instructions thereon for causing a processor to carry out aspects of the embodiments of the invention.

Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer readable storage medium should not be construed as transitory signals per se (e.g., radio waves or other propagating electromagnetic waves, electromagnetic waves propagating through a transmission media such as a waveguide, or electrical signals transmitted through a wire). Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flowcharts, sequence diagrams, and/or block diagrams.

In certain alternative embodiments, the functions, acts, and/or operations specified in the flowcharts, sequence diagrams, and/or block diagrams may be re-ordered, processed serially, and/or processed concurrently consistent with embodiments of the invention. Moreover, any of the flowcharts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A method for implementing a predictive database for a computer process, the method comprising:
    receiving, at one or more processors, historic input data that includes a plurality of data objects entered for each of a plurality of successful computer processes requested by a plurality of users;
    determining, by the one or more processors, a plurality of relationships based on the historic input data, each of the relationships including a first one of the data objects entered for one of the successful computer processes linked to a second one of the data objects entered for the one successful computer process;
    generating, by the one or more processors, a decision tree based on the relationships;
    filtering, by the one or more processors, the decision tree based on an optimization threshold to reduce the decision tree;
    generating, by the one or more processors, a plurality of rules based on the filtered decision tree, each of the rules including a third data object linked to a fourth data object, wherein for each rule, the third data object of the respective rule includes at least a portion of the first data object of a first one of the relationships, and the fourth data object of the respective rule includes the second data object of the first one of the relationships; and
    storing, by the one or more processors, the rules in the predictive database.

2. The method of claim 1, further comprising:
    receiving partial input data entered by a user in relation to a request for the computer process, the partial input data including the third data object of one of the rules; and
    in response to the partial input data being received:
        retrieving, from the predictive database, the rules;
        determining the one rule from the retrieved rules based on the partial input data; and
        supplying the fourth data object of the one rule to the requested computer process.

3. The method of claim 1, wherein the decision tree comprises a plurality of paths, each of the paths corresponding to one or more of the relationships.

4. The method of claim 3, wherein filtering the decision tree based on the optimization threshold to reduce the decision tree comprises:
    removing from the decision tree each path for which the number of the relationships corresponding thereto is less than the optimization threshold.

5. The method of claim 3, wherein each path is associated with a probability that is based on the number of the relationships corresponding to the respective path and the total number of determined relationships, and filtering the decision tree based on the optimization threshold to reduce the decision tree comprises:
    removing from the decision tree each path for which the probability associated therewith is less than the optimization threshold.

6. The method of claim 1, wherein the decision tree comprises a first node and a plurality of second nodes linked to the first node, each of the second nodes corresponding to a different one or more of the relationships.

7. The method of claim 6, wherein the first node tracks the number of the relationships corresponding to each of the second nodes, and filtering the decision tree based on the optimization threshold to reduce the decision tree comprises:
    removing each second node for which the number of the relationships tracked by the first node is less than the optimization threshold.

8. The method of claim 6, wherein the first node tracks a probability for each second node that is based on the number of the relationships corresponding to the second node and the total number of relationships corresponding to the second nodes, and filtering the decision tree based on the optimization threshold to reduce the decision tree comprises:
    removing each second node for which the probability tracked by the first node is less than the optimization threshold.

9. The method of claim 1, wherein one of the rules further includes a fifth data object linked to the third data object of the one rule, the fifth data object differing from the fourth data object of the one rule and including the second data object of a second one of the relationships,
    wherein the first data object of the second one of the relationships includes the third data object of the one rule.

10. The method of claim 9, wherein the one rule includes a first probability associated with the fourth data object of the one rule and a second probability associated with the fifth data object of the one rule, the first probability is greater than the second probability, and further comprising:
    receiving partial input data entered by a user in relation to a request for the computer process, the partial input data including the third data object of the one rule; and
    in response to the partial input data being received:
        retrieving, from the predictive database, the rules;
        determining the one rule from the retrieved rules based on the partial input data;
        in response to the one rule being determined, determining the fourth data object of the one rule as a primary result and the fifth data object of the one rule as a secondary result based on the first probability and the second probability;
        supplying the primary result to the requested computer process; and
        after the primary result is supplied to the requested computer process, in response to the requested computer process being unsuccessful, supplying the secondary result to the requested computer process.

11. A system for implementing a predictive database for a computer process, the system comprising:
    one or more processors; and
    a memory storing instructions that, upon execution by the one or more processors, cause the system to:
        in response to historic input data being received that includes a plurality of data objects entered for each of a plurality of successful computer processes requested by a plurality of users:

determine a plurality of relationships based on the historic input data, each of the relationships including a first one of the data objects entered for one of the successful computer processes linked to a second one of the data objects entered for the one successful computer process;

generate a decision tree based on the relationships;

filter the decision tree based on an optimization threshold to reduce the decision tree;

generate a plurality of rules based on the filtered decision tree, each of the rules including a third data object linked to a fourth data object, wherein for each rule, the third data object of the respective rule includes at least a portion of the first data object of a first one of the relationships, and the fourth data object of the respective rule includes the second data object of the first one of the relationships; and store the rules in the predictive database.

12. The system of claim 11, wherein the instructions upon execution further cause the system to:

in response to partial input data entered by a user in relation to a request for the computer process being received, the partial input data including the third data object of one of the rules:

retrieve, from the predictive database, the rules;

determine the one rule from the retrieved rules based on the partial input data; and supply the fourth data object of the one rule to the requested computer process.

13. The system of claim 11, wherein the decision tree comprises a plurality of paths, each of the paths corresponding to one or more of the relationships, and the instructions cause the system to filter the decision tree based on the optimization threshold to reduce the decision tree by causing the system to:

remove from the decision tree each path for which the number of the relationships corresponding thereto is less than the optimization threshold.

14. The system of claim 11, wherein the decision tree comprises a plurality of paths, each of the paths corresponding to one or more of the relationships and being associated with a probability that is based on the number of the relationships corresponding to the respective path and the total number of determined relationships, and the instructions cause the system to filter the decision tree based on the optimization threshold to reduce the decision tree by causing the system to:

remove from the decision tree each path for which the probability associated therewith is less than the optimization threshold.

15. The system of claim 11, wherein the decision tree comprises a first node and a plurality of second nodes linked to the first node, each of the second nodes being associated with one or more of the relationships.

16. The system of claim 15, wherein the first node tracks the number of the relationships corresponding to each of the second nodes, and the instructions cause the system to filter the decision tree based on the optimization threshold to reduce the decision tree by causing the system to:

remove each second node for which the number of the relationships tracked by the first node is less than the optimization threshold.

17. The system of claim 15, wherein the first node tracks a probability for each second node that is based on the number of the relationships corresponding to the second node and the total number of relationships corresponding to the second nodes, and the instructions cause the system to filter the decision tree based on the optimization threshold to reduce the decision tree by causing the system to:

remove each second node for which the probability tracked by the first node is less than the optimization threshold.

18. The system of claim 11, wherein one of the rules further includes a fifth data object linked to the third data object of the one rule, the fifth data object differing from the fourth data object of the one rule and including the second data object of a second one of the relationships, wherein the first data object of the second one of the relationships includes the third data object of the one rule.

19. The system of claim 18, wherein the one rule includes a first probability associated with the fourth data object of the one rule and a second probability associated with the fifth data object of the one rule, the first probability is greater than the second probability, and the instructions upon execution further cause the system to:

in response to receiving partial input data entered by a user in relation to a request for the computer process, the partial input data including the third data object of the one rule:

retrieve, from the predictive database, the rules;

determine the one rule from the retrieved rules based on the partial input data;

in response the one rule being determined, determine the fourth data object of the one rule as a primary result and the fifth data object of the one rule as a secondary result based on the first probability and the second probability;

supply the primary result to the requested computer process; and after the primary result is supplied to the requested computer process, in response to the requested computer process being unsuccessful, supply the secondary result to the requested computer process.

20. A computer program product comprising:

a non-transitory computer readable medium; and instructions stored on the non-transitory computer readable medium that, upon execution by one or more processors of a system, cause the system to:

in response to historic input data being received that includes a plurality of data objects entered for each of a plurality of successful computer processes requested by a plurality of users:

determine a plurality of relationships based on the historic input data, each of the relationships including a first one of the data objects entered for one of the successful computer processes linked to a second one of the data objects entered for the one successful computer process;

generate a decision tree based on the relationships;

filter the decision tree based on an optimization threshold to reduce the decision tree;

generate a plurality of rules based on the filtered decision tree, each of the rules including a third data object linked to a fourth data object, wherein for each rule, the third data object of the respective rule includes at least a portion of the first data object of a first one of the relationships, and the fourth data object of the respective rule includes the second data object of the first one of the relationships; and store the rules in a predictive database.

* * * * *